No. 772,904. PATENTED OCT. 18, 1904.
G. OPPERMANN.
FLUID PRESSURE BRAKE.
APPLICATION FILED DEC. 6, 1902.
NO MODEL.

WITNESSES:
J. Custer
Jas. B. MacDonald

INVENTOR,
Georg Oppermann
By E. Wright
Att'y.

No. 772,904.                                                                    Patented October 18, 1904.

UNITED STATES PATENT OFFICE.

GEORG OPPERMANN, OF HANOVER, GERMANY, ASSIGNOR TO THE WESTINGHOUSE AIR BRAKE COMPANY, OF PITTSBURG, PENNSYLVANIA, A CORPORATION OF PENNSYLVANIA.

FLUID-PRESSURE BRAKE.

SPECIFICATION forming part of Letters Patent No. 772,904, dated October 18, 1904.

Application filed December 6, 1902. Serial No. 134,101. (No model.)

*To all whom it may concern:*

Be it known that I, GEORG OPPERMANN, a subject of the Emperor of Germany, residing in the city of Hanover, Germany, have invented a certain new and useful Improvement in Fluid-Pressure Brakes, of which improvement the following is a specification.

My invention relates to fluid-pressure brakes, and has for its object to provide an improved automatic brake apparatus by means of which a quick and powerful application of the brakes may be secured in emergencies, while in service the braking force may be graduated both up and down at will, thus giving a perfect control of the pressure upon the brake-shoes and at the same time having a stored power constantly in reserve, which may be used to exert its force upon the brake-shoes to a greater or lesser extent, as desired.

With this object in view my invention comprises an automatic fluid-pressure brake device combined with an additional or supplemental brake-piston, which is subject to a force constantly tending to apply the brakes and is exposed on one side to pressure from the auxiliary reservoir opposing said force; and it also consists in certain novel combinations and improved features of construction, all as hereinafter more fully set forth.

Figure 1:
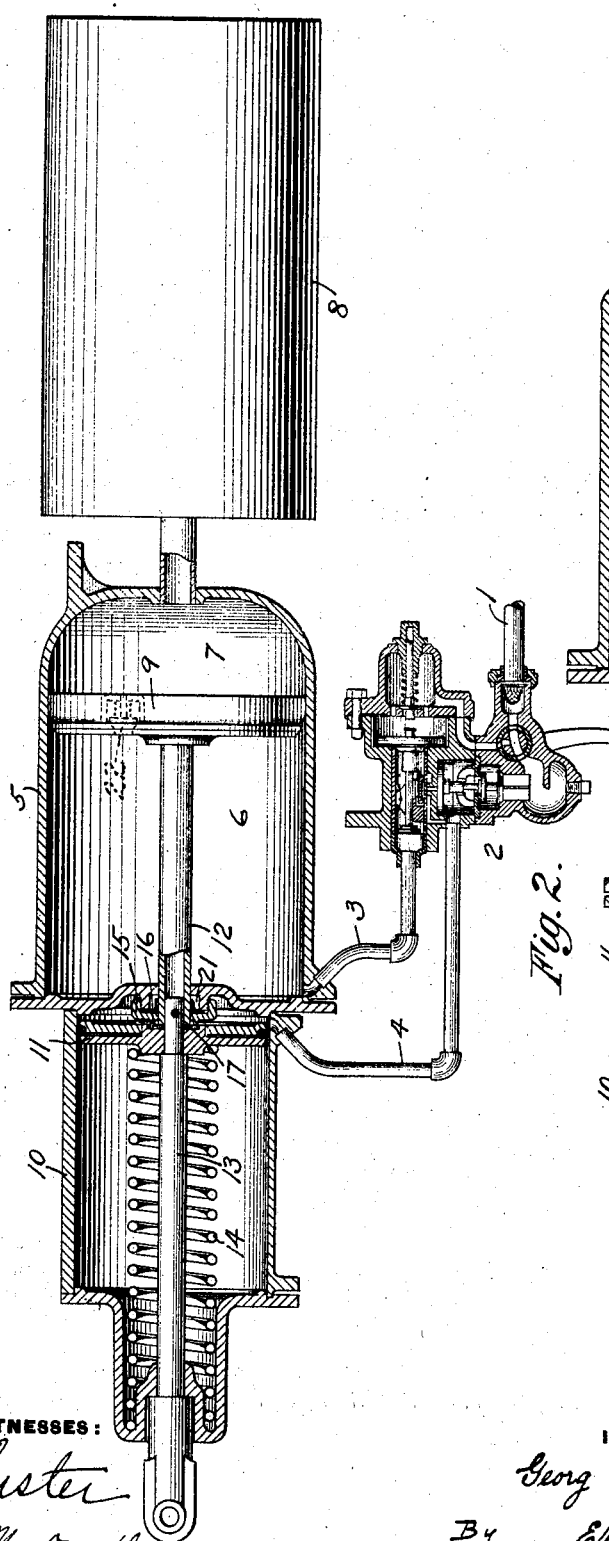
Figure 2:
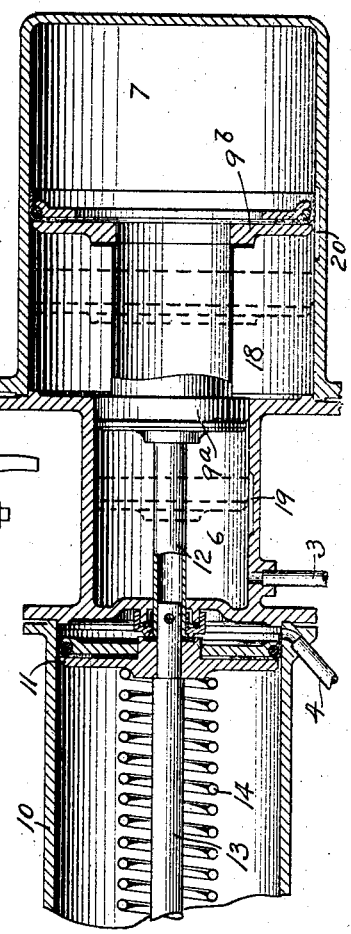

In the accompanying drawings, Figure 1 is a sectional view showing a fluid-pressure brake apparatus embodying my improvement, and Fig. 2 is a sectional view showing a modified form of auxiliary reservoir and supplemental piston.

According to the construction shown in Fig. 1, the branch pipe 1, leading from the train-pipe, is connected to the ordinary quick-action triple-valve device 2, which is connected to the reservoir 5 by a pipe 3 and to the brake-cylinder 10 by means of a pipe 4, as usual. The reservoir or cylinder 5 is divided into two chambers 6 and 7 by a movable wall or piston 9, the chamber 6 constituting the auxiliary reservoir-chamber and the chamber 7 a supplemental or storage reservoir, which may be of any desired shape or capacity. As shown in the drawings, a cylinder 8 is connected to chamber 7 and forms an enlargement thereof. The supplemental piston 9 is provided with a stem 12, which extends through a stuffing-box 21 into the brake-cylinder and is preferably secured to the stem 13 of the brake-piston 11. The gland 15 of the stuffing-box may be provided with a raised seat 16, adapted to bear against a packing-strip 17, carried by the brake-piston 11 when the latter is held in release position by the pressure of the spring 14, thus preventing leakage of air through the stuffing-box while the brake is released. The relative sizes of pistons 11 and 9 may be varied to suit different working conditions.

The operation is as follows: Compressed air from the train-pipe is charged from the train-pipe through pipe 1 to the triple valve 2, moving the piston thereof to release position and passing through the feed-groove, valve-chamber, and pipe 3 into the auxiliary reservoir-chamber 6, thereby charging same and also supplemental or storage chamber 7 up to full normal train-pipe pressure, since the cup-leather packing of piston 9 allows the air to flow freely past the piston from chamber 6 to chamber 7. Upon a slight and gradual reduction in train-pipe pressure being made the triple valve moves to service position in the usual way and opens the graduating-port from chamber 6 to the brake-cylinder. As the air under pressure begins to flow and accumulate in the brake-cylinder the brake-piston moves outward the full length of its stroke, at the same time causing the supplemental piston to move an equal distance, since these pistons are connected by stem 12. This movement of the supplemental piston would have a tendency to raise the pressure in the chamber 6; but any such excess pressure finds a ready outlet around the piston into chamber 7, some of the air which is displaced by this movement of the supplemental piston being merely transferred around the cup-leather packing to the storage-chamber 7. Additional check valves, such as 22, may be located in the piston 9, if desired, to facilitate this movement. When the pistons have completed the stroke and the brake-shoes are engaging the car-wheels, the pressure in auxiliary reservoir-chamber 6 continues to discharge into the brake-cylinder and decreases to a point slightly below that of the train-pipe, when the triple valve moves to close the graduating-port in the usual way. Further reductions of train-pipe pressure cause the triple valve to again discharge air from the auxiliary reservoir-chamber to the brake-cylinder, thus gradually reducing the pressure in chamber 6 and increasing the pressure in the brake-cylinder. While the pressure is reduced in chamber 6, the higher-stored pressure in chamber 7 is retained, since it cannot pass the cup-leather packing of piston 9 in the opposite direction, and this pressure acting on piston 9 serves to increase the force with which the brakes are applied, according to the amount that such pressure exceeds that remaining in chamber 6 on the opposite side of the piston 9. The effective pressures upon both pistons may thus be increased by successive reductions of train-pipe pressure until the pressure in the brake-cylinder is equalized with that in the auxiliary reservoir-chamber 6, the brakes being applied with full force. To release the brakes, a small increase is made in the train-pipe pressure, which causes the triple valve to move to release position and discharge the pressure in the brake-cylinder to the atmosphere; but the pressure in chamber 6 being raised only to that of the train-pipe the brakes still remain applied with a force due to the difference in pressure on opposite sides of piston 9. The braking pressure may then be gradually decreased by gradually raising the train-pipe pressure or the braking pressure may be increased at any time by a reduction of train-pipe pressure. In this way the braking pressure may be graded up or down at will, thus giving perfect control of the brakes. As the pressure in train-pipe is restored to normal and pressure in reservoir-chamber 6 rises to that of the storage-chamber 7 the supplemental piston 9 will then be in equilibrium and the spring 14 will force the two pistons back to release position, as shown in the drawings.

In order to maintain the capacity of the auxiliary reservoir-chamber substantially constant during the movement of the brake-pistons from release position to application position, a modified form of reservoirs and supplemental piston, such as shown in Fig. 2, may be provided. According to this arrangement the supplemental piston is made in the form of a differential piston having the two heads $9^a$ and $9^b$ fitting within reservoirs of corresponding size. A groove 19 is made in the wall of the chamber 6 to establish communication around the head $9^a$ when the same is in application position and a groove 20 is located in the wall of storage-chamber 7 to establish communication around the large head $9^b$ of the piston when the same is in release position. When the brakes are released, the auxiliary reservoir-chamber comprises the capacity of cylinder 6, and the annular space 18 about the supplemental piston communicates through the groove 20 with the storage-chamber 7 and forms a part thereof. When the pistons move to application position, as indicated in dotted lines, the head $9^b$ moves away from the groove 20, while the head $9^a$ moves onto the groove 19, and the annular space 18 then communicates through groove 19 with chamber 6 and forms a part thereof. The capacity of the annular space 18 is about equal to that portion of cylindrical chamber 6 traversed by the head $9^a$ of the piston, so that the capacity of the chamber forming the auxiliary reservoir is substantially the same when the brakes are applied as when they are released. By this means a more definite graduating action may be obtained corresponding to certain reductions of train-pipe pressure; otherwise the operation of this modified form of my improved apparatus is the same as that before described.

It will now appear that this improved device constitutes, practically, a double brake in which the braking power is divided upon two pistons, one of which is constantly subject to pressure from a reserve storage-reservoir and may be used for applying brakes when the other piston fails or becomes inoperative by reason of leakage, irregularities caused by bad maintenance, or unskilful use. If, owing to several applications of the brakes being made in rapid succession or for any other reason, the pressure in auxiliary reservoir-chamber 6 becomes lower than it should be, the excess pressure in storage-reservoir 7 is correspondingly increased, so that piston 9 supplies the braking force which may be lost on piston 11 in the brake-cylinder. If for any possible reason the triple valve should not respond to the reduction of train-pipe pressure, but remain stuck in release position, communication from reservoir 6 to the train-pipe would still be open and the brakes would be applied by the supplemental piston 9, owing to the falling of the pressure in chamber 6 on one side of said piston.

With this apparatus smaller brake-cylinders may be employed than that at present in use, and the consumption of air is consequently much reduced, making it possible to use smaller air-pumps.

An exceptionally high braking force may be developed by means of this apparatus for use on trains running at high rates of speed simply by increasing the normal working pressure. The air in the brake-cylinder 10 may then be released and the braking force thus reduced when the velocity of the train has decreased to a certain rate of speed. The brake may at any time be partly released and the braking power remaining may be gradually further reduced or again increased as circumstances may require. When the brake has been partly or wholly released, the quick action of the triple valve can always be secured by an emergency application, even if the train-pipe is locally vented to the brake-cylinders.

Various changes of form and modified arrangements of parts may be made without departing from the spirit of my invention.

Having now described my invention, what I claim as new, and desire to secure by Letters Patent, is—

1. In a fluid-pressure brake, the combination with a single line of train-pipe, a triple valve, auxiliary reservoir and brake-cylinder, of a supplemental brake-piston exposed on one side to auxiliary-reservoir pressure.

2. In a fluid-pressure brake, the combination with a triple valve, auxiliary reservoir and brake-cylinder, of a storage-reservoir and a supplemental piston exposed on one side to the auxiliary-reservoir pressure and on the other side to pressure from the storage-reservoir.

3. In a fluid-pressure brake the combination with a triple valve, auxiliary reservoir and brake-cylinder, of a supplemental brake-piston subject to a continuous pressure on one side tending to apply the brakes and exposed on its opposite side to pressure from the auxiliary reservoir.

4. In a fluid-pressure brake, the combination with a triple valve, auxiliary reservoir and brake-cylinder, of a storage-reservoir, a supplemental brake-piston exposed on opposite sides to auxiliary-reservoir pressure and storage-reservoir pressure, and means for charging the storage-reservoir with fluid under pressure.

5. In a fluid-pressure brake, the combination with a train-pipe, a triple valve operated by variations of fluid-pressure in said train-pipe, auxiliary reservoir and brake-cylinder, of a supplemental piston located in the auxiliary reservoir.

6. In a fluid-pressure brake, the combination with a triple valve, auxiliary reservoir and brake-cylinder, of a supplemental brake-piston located in the end of the auxiliary reservoir, and a storage-reservoir communicating with the opposite side of said piston.

7. In a fluid-pressure brake, the combination with a triple valve, auxiliary reservoir and brake-cylinder having a brake-piston, of a supplemental brake-piston located in the end of the auxiliary reservoir and having a stem extending into the brake-cylinder and connected to the stem of the main brake-piston, and means for retaining the pressure back of said supplemental piston when the auxiliary-reservoir pressure is reduced.

8. In a fluid-pressure brake, the combination of a brake-cylinder having a piston, auxiliary reservoir having a supplemental piston, a release-spring, a connecting-stem between said pistons passing through a stuffing-box in the wall of reservoir, and a raised seat between the first brake-piston and the stuffing-box gland to prevent leakage through said stuffing-box.

9. In a fluid-pressure brake, the combination of a brake-cylinder, an auxiliary reservoir-chamber, a storage-chamber, a differential piston having two heads for dividing said chambers, means for establishing communication between opposite sides of one of the heads when the piston is in one position and means for closing said communication and opening a passage around the other head when the piston is moved to another position.

10. In a fluid-pressure brake, the combination with an auxiliary reservoir and brake-cylinder, of a storage-reservoir, a supplemental piston exposed on opposite sides to auxiliary-reservoir pressure and to storage-reservoir pressure respectively, and means for maintaining the capacity of the auxiliary reservoir substantially constant as the supplemental piston moves from release position to application position.

In testimony whereof I have hereunto set my hand.

GEORG OPPERMANN.

Witnesses:
 LEONORE RASCH,
 C. C. STEVENSON.